(12) United States Patent
Ware et al.

(10) Patent No.: US 7,796,550 B2
(45) Date of Patent: Sep. 14, 2010

(54) METHOD AND APPARATUS FOR PACKET SCHEDULING IN A WIRELESS NETWORK

(75) Inventors: Christopher G. Ware, Chicago, IL (US); Randy L. Ekl, Lake Zurich, IL (US); Anthony R. Metke, Naperville, IL (US)

(73) Assignee: General Instrument Corporation, Horsham, PA (US)

( * ) Notice: Subject to any disclaimer, the term of this patent is extended or adjusted under 35 U.S.C. 154(b) by 991 days.

(21) Appl. No.: 11/301,855

(22) Filed: Dec. 13, 2005

(65) Prior Publication Data

US 2007/0133454 A1    Jun. 14, 2007

(51) Int. Cl.
*H04W 4/00* (2009.01)
(52) U.S. Cl. .......................... 370/329; 370/444; 370/468
(58) Field of Classification Search ................. 370/329, 370/230, 235, 320, 341, 437, 443, 444, 468; 455/450, 452, 452.1, 452.2, 510, 464, 509, 455/517, 524
See application file for complete search history.

(56) References Cited

U.S. PATENT DOCUMENTS

| | | | |
|---|---|---|---|
| 6,219,343 B1 * | 4/2001 | Honkasalo et al. | 370/335 |
| 6,657,980 B2 * | 12/2003 | Holtzman et al. | 370/329 |
| 6,947,397 B2 * | 9/2005 | Kim et al. | 370/329 |
| 2002/0044527 A1 | 4/2002 | Jiang et al. | |
| 2002/0147022 A1 | 10/2002 | Subramanian et al. | |

FOREIGN PATENT DOCUMENTS

| | | |
|---|---|---|
| WO | 2002104045 | 12/2002 |
| WO | 2003051007 | 6/2003 |
| WO | 2005074179 | 8/2005 |
| WO | 2005084375 | 9/2005 |

OTHER PUBLICATIONS

PCT International Search Report and Written Opinion for PCT/US06/46151. Mall date Nov. 2, 2007.

* cited by examiner

*Primary Examiner*—Dmitry H Levitan
*Assistant Examiner*—Dady Chery
(74) *Attorney, Agent, or Firm*—Larry T. Cullen

(57) ABSTRACT

Method and apparatus for packet scheduling in a wireless network is described. First values for a data transmission rate are measured for each of a plurality of mobile stations over time. Second values for a function of the data transmission rate are computed using at least one of the first values for each of the mobile stations. A rate of change of the data transmission rate is computed for each of the plurality of mobile stations using the second values associated therewith. A stability of the data transmission rate is computed for each of the plurality of mobile stations using the second values associated therewith. A channel quality factor is determined for each of the mobile stations using a current value of the second values, the rate of change of the function, and the stability of the function associated therewith.

22 Claims, 4 Drawing Sheets

METHOD AND APPARATUS FOR PACKET SCHEDULING IN A WIRELESS NETWORK

BACKGROUND OF THE INVENTION

1. Field of the Invention

The present invention relates to scheduling algorithms for packet transmission and, more particularly, to a method and apparatus for packet scheduling in a wireless network.

2. Description of the Background Art

In several types of wireless networks, such as wireless local area networks (WLANs) and cellular telephone networks, packets destined for individual mobile stations accumulate in a buffer until they can be served by a base station and transmitted to their destinations. A flow of data traffic (i.e., a sequence of packets) can be identified for each mobile station served by the base station. In such wireless networks, the base station may utilize different data transmission rates among the mobile stations, depending on channel quality. An important area of current study is how to best devise a scheduling algorithm that directs the base station, at a given time, how to allocate its total capacity among individual data transmission rates to the respective mobile stations.

Current probabilistic packet-based scheduling algorithms, such as the modified largest weighted delay first (M-LWDF) algorithm, have been shown to achieve suboptimal performance when scheduling heterogeneous traffic flows under conditions of continued network instability. Additional problems exist for such algorithms during periods of transmission rate oscillation. For example, the M-LWDF algorithm relies on the ratio of instantaneous transmission rate to average transmission rate for each of the mobile stations to assign priorities to respective traffic flows. However, when such a ratio is employed, the following occurs:

1) A traffic flow will immediately receive high priority after the transmit rate spikes upwards, but will then receive lower and lower priority as the transmit rate stabilizes.

2) As the transmit rate decreases the flow is given lower priority, resulting in increased queuing delay. This will force the packet to be transmitted when the flow is near its lowest recent transmit rate.

3) After the flow reaches its minimum transmit rate and maintains such minimum transmit rate for a period of time, the average is minimized. If the transmit rate begins to climb, the ratio of instantaneous transmission rate to average transmission rate will quickly increase again, causing the system to transmit at or near the lowest transmit rate.

4) If the transmit rate is quickly cycling between two extremes, the result is a high priority for the traffic flow after a large upswing, and a low priority for the traffic flow after a large downswing. This is somewhat arbitrary. As the cycling is occurring quickly, there is benefit (in terms of overall system capacity) in waiting until the transmit rate stabilizes before adjusting the priority for the traffic flow.

5) If the channel is unstable, the ratio of instantaneous transmission rate to average transmission rate yields alternating high and low priority to the flow. The priority may become unsynchronized with the transmit rate.

Accordingly, there exists a need in the art for a method and apparatus for packet scheduling that exhibits improved performance in conditions of network instability and transmission rate oscillation.

SUMMARY OF THE INVENTION

Method and apparatus for packet scheduling in a wireless network is described. In one embodiment, the wireless network includes a base station and a plurality of mobile stations. First values for a data transmission rate are measured for each of the plurality of mobile stations over time. Second values for a function of the data transmission rate are computed using at least one of the first values for each of the mobile stations. A rate of change of the data transmission rate is computed for each of the plurality of mobile stations using the second values associated therewith. A stability of the data transmission rate is computed for each of the plurality of mobile stations using the second values associated therewith. A channel quality factor is determined for each of the mobile stations using a current value of the second values, the rate of change of the function, and the stability of the function associated therewith.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
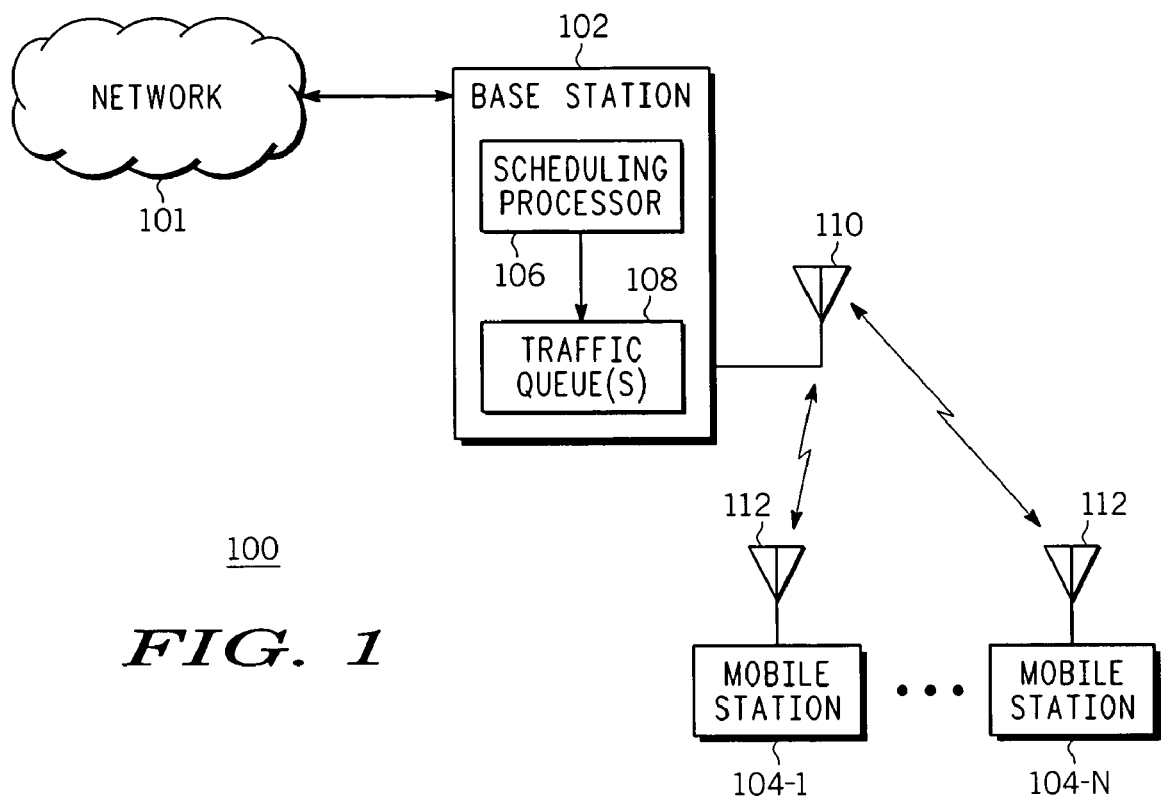
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The system 100 includes a network 101, a base station 102, and mobile stations 104-1 through 104-N (collectively referred to as mobile stations 104), where N is an integer greater than one. The base station 102 includes scheduling processor 106, traffic queue memory 108, and an antenna 110. Each of the mobile stations 104 includes an antenna 112. The base station 102 is coupled to the network 101 and maintains a wireless link between the antenna 110 and the antenna 112 of each of the mobile stations 104. For example, the communication system 100 may comprise a wireless local area network (WLAN), where the base station 102 is an access point or a wireless router. Those skilled in the art will appreciate that the communication system 100 may comprise other types of wireless networks known in the art, such as cellular telephone networks.

In particular, the base station 102 serves the mobile stations 104 within its service area. The base station 102 receives data packets destined for the mobile stations 104 from the network 101. The data packets are stored, while awaiting service, in the traffic queue memory 108. A stream of data packets for a given mobile station is referred to herein as a "traffic flow." The scheduling processor 106 schedules respective traffic flows for service. Exemplary scheduling algorithms are described below. The base station 102 serves each traffic flow by transmitting them towards the destined mobile station over a shared communication channel. For purposes of clarity by example, the invention is described with respect to unidirectional transmission from the base station 102 to the mobile stations 104. It is to be understood that the invention may be adapted for use with unidirectional transmission from the mobile devices 104 to the base station 102 or with bidirectional exchange of traffic between the mobile devices 104 and the base station 102. That is, the base station 102 may schedule opportunities for the mobile stations 104 to transmit traffic to the base station 102. The base station 102 may also schedule opportunities for the base station 102 and the mobile stations 104 to exchange traffic. While embodiments of the invention are described below with respect to scheduling of traffic flows, those skilled in the art will appreciate that such embodiments may be employed to scheduling the opportunities for the mobile stations 104 to transmit traffic to the base station 102 or for the base station 102 and the mobile stations 104 to exchange traffic.

The base station 102 sends the packets of a given traffic flow to the destined mobile station at the maximum available rate. The base station 102 has available a discrete set of possible data transmission rates up to a maximum rate. For example, if the system 100 comprises an IEEE 802.11a WLAN, the base station 102 has available data transmission rates ranging from 6 to 54 Mbit/s (i.e., 6, 9, 12, 18, 24, 36, 48, and 54 Mbit/s). In general, selection of a data transmission rate depends on channel conditions and interference conditions. The "maximum available rate" to a particular mobile station is the greatest rate currently supported by the wireless link between the base station 102 and the mobile station. In some cases, the mobile stations 104 may be configured to send periodic signals to the base station 102 that contain indications of channel quality. For example, the signals may indicate the current signal-to-noise ratio (SNR) for signals received at the mobile stations from the base station. The base station 102 is configured to determine the maximum available rates from the transmitted indications of channel quality. In other cases, the mobile stations 104 may be configured to send periodic signals to the base station 102 that indicate the maximum data rate achievable.

The base station 102 is configured to obtain the maximum available data rate (hereinafter referred to as the current data rate) for each of the mobile stations 104 repeatedly over time. The period between measurements of the current data rate for a given mobile station ("measurement period") should be short enough that, within a single such measurement period, the current data rate can be treated as constant without introducing excessive error. In this manner, the base station 102 maintains a current data rate for each of the mobile stations 104. As described below, the scheduling processor 106 uses the current data rate to derive a channel quality factor (CQF) value for each of the mobile stations 104. The CQF value may be used to indicate the type of priority a given traffic flow should be assigned. The scheduling processor 106 uses the CQF values as parametric input to a quality of service (QoS) scheduling algorithm for scheduling the traffic flows for transmission.

Figure 2:
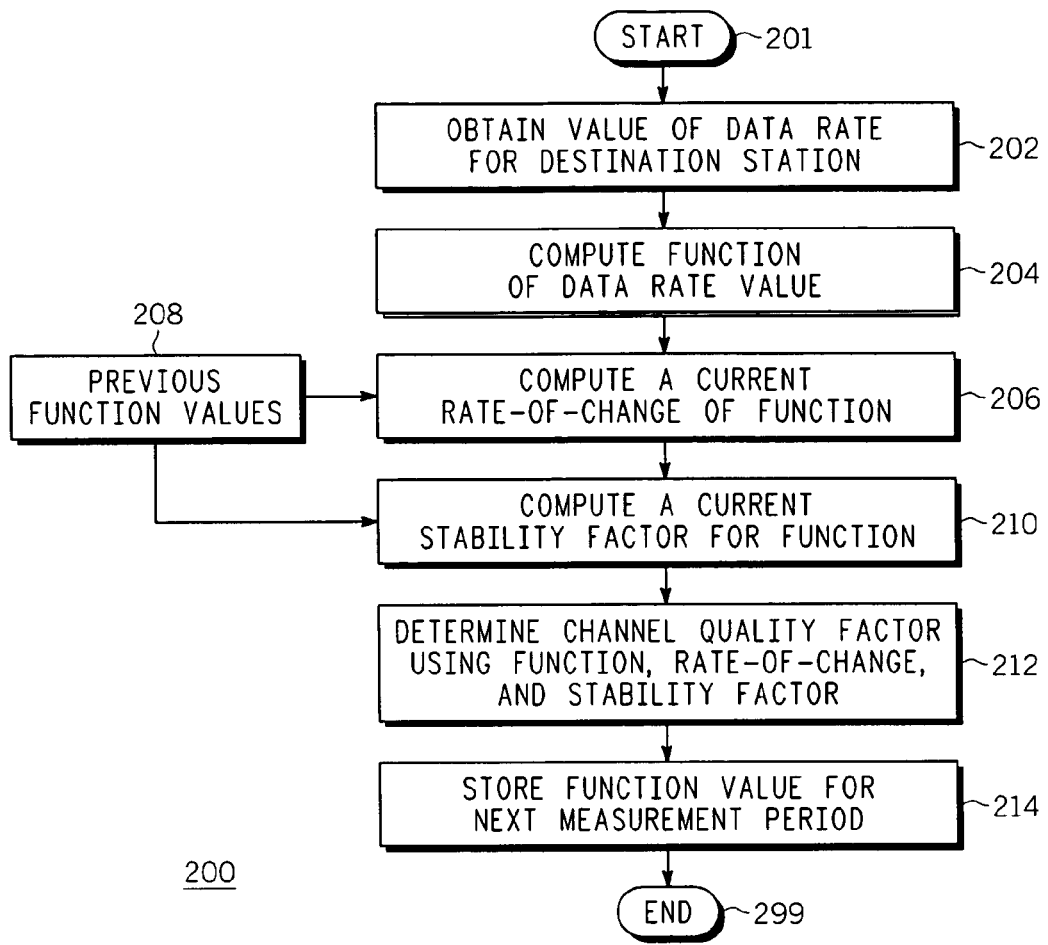
FIG. 2 is a flow diagram depicting an exemplary embodiment of a method for determining a CQF for a mobile station during one measurement period in accordance with one or more aspects of the invention.

FIG. 2 is a flow diagram depicting an exemplary embodiment of a method 200 for determining a CQF for a mobile station during one measurement period in accordance with one or more aspects of the invention. The method 200 may be performed by the scheduling processor 106 for each of the mobile stations 104. The method 200 is performed during the ith measurement period. The method 200 begins at step 201. At step 202, a value of the data transmission rate for the mobile station is obtained. The data rate value for the ith measurement period is defined as $r_i(t)$. At step 204, a value of a function of the data rate ("data rate function") is obtained using the current data rate value or the current data rate value and one or more previous data rate values. In one embodiment, the data rate function is a rate factor (RF). The data rate is normalized to obtain a rate factor value, denoted $R_i(t)$. In one embodiment, the rate factor (RF) is determined as follows:

$$RF = \frac{\text{data rate}}{\text{maximum data rate}/X},$$

where the maximum data rate is the maximum possible data rate and X is selected in accordance with the desired range of the normalized result. For example, if X is 2, then the RF will range from 0 to 2.

In another embodiment, the function of the data rate is a magnitude factor (MGF). The MGF is a measure indicative of the relative change in the magnitude of the data transmission rate with respect to the maximum allowed data transmission rate. Such a measure is important when considering overall system capacity and the impact that variability of the transmission rate can have on other traffic flows in the system. For example, consider a traffic flow that conveys a 2 Mbit/s video stream. A change in the data transmission rate from 54 to 36 Mbit/s does not substantially affect the traffic flow or the overall system capacity. However, a change in the data transmission rate from 54 to 12 Mbit/s, for example, can have a substantial affect. For example, if the data transmission rate decreases from 54 to 12 Mbit/s, the overall system capacity will be impacted as the traffic flow now takes 4.5 times longer to transmit at 12 Mbit/s than at 54 Mbit/s.

If the magnitude of the data transmission rate is high in comparison with the peak rate required to support the traffic flow, the relative magnitude of any variability will have less impact on system capacity. In this case, there is advantage in not responding to rate changes until the transmission rate has dropped significantly. However, when the data rate is low with respect to the peak rate required, variability has a significant impact on system capacity and the performance of the traffic flow. In this case, there is advantage in treating the traffic flow as conservatively as possible, waiting for any possible longer term increase in data rate prior to taking any action. This can be used to avoid fluctuation in system capacity, and will reduce the impact on other traffic flows in the system.

In one embodiment, the MGF is determined as follows:

$$MGF = \frac{r_i(t) + r_{i-1}(t) + r_{i-2}(t)}{4 * R_{MAX}},$$

where $r_i(t)$ is the current value of the data transmission rate, $r_{i-1}(t)$ and $r_{i-2}(t)$ are the previous two values of the data transmission rate, and $R_{MAX}$ is the maximum allowed data transmission rate. The MGF can be used in place of the RF in scenarios where maximizing system capacity and minimizing the impact of highly variable traffic flows on the other traffic flows supported by the system are paramount. Likewise, the RF can be used in scenarios where system capacity is less important than the QoS performance of an individual traffic flow.

At step 206, a rate of change value of the data rate function is computed for the current measurement period using the current value of the data rate function and one or more previous values of the data rate function obtained at step 208 (i.e., data rate function values obtained from previous measurement periods). The rate of change of the data rate function is referred to as the slope factor (SLF). The SLF is a measure of whether the data rate function has been recently increasing or decreasing. In one embodiment, the SLF is determined as follows:

$$SLF = 1 - \left[\frac{\sum_{x=0}^{k}(F_{i-x}(t) - F_{i-x-1}(t))}{N}\right], k > 0,$$

where $F_i(t)$ is the current value of the data rate function from step 204, $F_{i-x}(t)$ is the value of the data rate function from the xth previous measurement period with respect to the ith measurement period, and N is the maximum value of the data rate function. The above equation yields an average rate of change of the data rate function over k measurement periods normalized to a range between 0 and N. While convenient, it is not necessary to normalize the SLF. The SLF may be the sum of any number of rate factor differences between successive measurement periods, such sum being bound between +N and −N. The rate of change of the rate factor over measurement periods can be computed using other well known techniques. For example, in another embodiment, the SLF can be computed by fitting values of the data rate function from several measurement periods to a curve and solving for the first derivative of the curve (i.e., instantaneous rate of change of the data rate function).

At step 210, a stability factor (STF) value for the data rate function is computed for the current measurement period using the current value of the data rate function from step 204 and one or more previous values of the data rate function obtained at step 208. The STF is a measure of whether the data rate function is consistent or rapidly changing from measurement period to measurement period. In one embodiment, the STF is determined as follows:

$$STF = 1 - \left[\frac{A|F_i(t) - F_{i-1}(t)| + B|F_{i-1}(t) - F_{i-2}(t)| + C|F_{i-2}(t) - F_{i-3}(t)|}{M}\right],$$

where A, B, and C are any desired values, M=N*(A+B+C), and N is the maximum value of the data rate function. The above equation yields a stability factor over three measurement periods. A plurality of differences between successive pairs of values of the data rate function is determined and a weighted sum of the plurality of differences is computed to produce the stability factor. In one embodiment, A=3, B=2, C=1, and N=2. In such an embodiment, the STF is normalized to range between 0 and 1. An STF value of 0 indicates that the data rate function is unstable (quickly changing), and an STF value of 1 indicates that the data rate function is stable. Those skilled in the art will appreciate that other values for A, B, and C can be selected such that the STF can range between different values. In addition, the values A, B, and C may change over time.

At step 212, a CQF value is determined for the current measurement period using the current value of the data rate function, the current value of the SLF, and the current value of the STF. In one embodiment, the CQF=(data rate function)*SLF*STF. Consider the case where the data rate function is normalized to range between 0 and 2, the SLF is normalized to range between 0 and 2, and the STF is normalized to a range between 0 and 1. In this case, the CQF ranges between 0 and 4 and is normalized about a target value of 2. The CQF value is used as parametric input to a QoS scheduling algorithm, as discussed below. The CQF value may be interpreted such that the base station 102 is less likely to transmit to mobile stations with a CQF less than the target value, and more likely to transmit to mobile stations with a CQF value more than the target value. At step 214, the current value of the data rate function is stored for use in the next measurement period. The method 200 ends at step 299.

Figure 7:
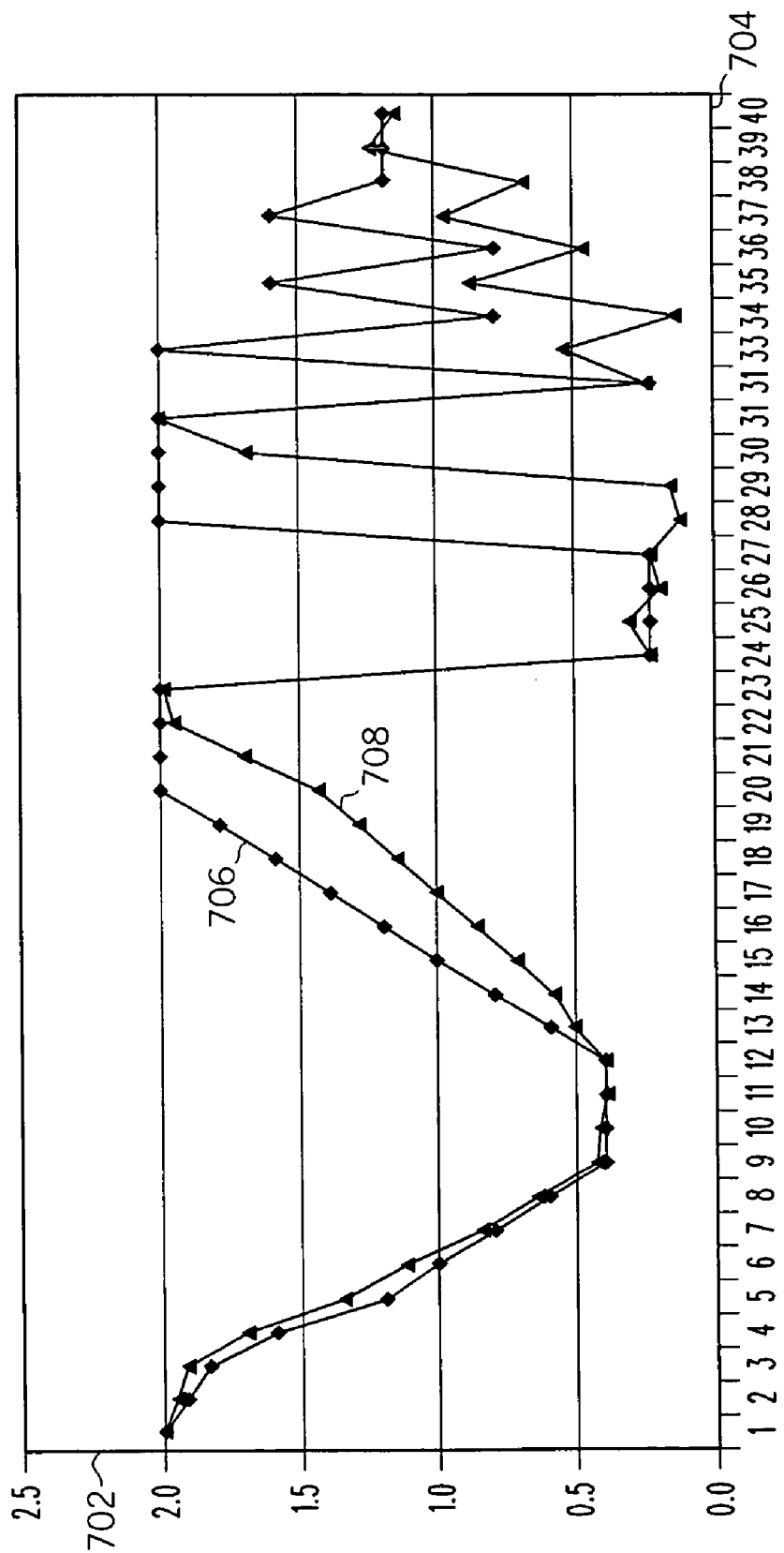
FIG. 7 depicts a graph of the RF and corresponding CQF for a mobile station over a set of measurement periods.

FIG. 7 depicts a graph 700 of an RF and corresponding CQF for a mobile station over a set of measurement periods. The graph 700 includes an axis 702 representative of magnitude of the RF and CQF, and an axis 704 representative of measurement period. In the present example, the axis 704 spans 40 measurement periods. A curve 706 represents the RF, and a curve 708 represents the CQF. In the present example, the RF is normalized to range between 0 and 2. As shown, the RF has an initial value of 2, which indicates that the data rate for the mobile station is at its maximum value. The RF then begins to fall towards a value of zero, reaching a value just below 0.5. The RF remains at this value for approximately four measurement periods and then begins to rise towards a value of 2. The CQF essentially follows the RF during this period. After the RF remains at a value of 2 for approximately four measurement periods, the RF sharply decreases to a value of approximately 0.25, remains at the value of 0.25 for four measurement periods, and sharply increases to a value of 2. While the CQF sharply decreases to follow the RF, the CQF does not immediately increase in response to the sharp increase in the RF. Thus, the CQF does not favor the mobile station as soon as its data rate spikes. This lowers the probability of selecting the traffic flow for a mobile station that has a rapidly fluctuating data rate until the data rate settles at a new value. The CQF exhibits similar behavior while the RF is oscillating.

Figure 3:
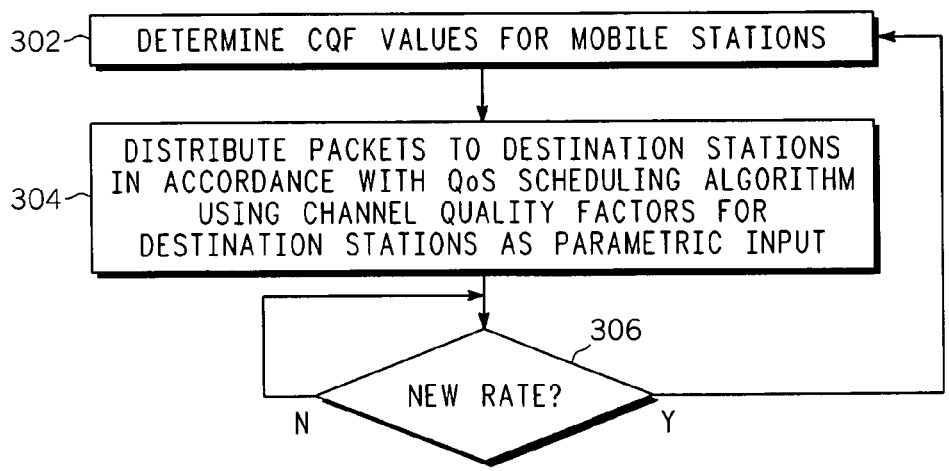
FIG. 3 is a flow diagram depicting an exemplary embodiment of a method for packet scheduling in accordance with one or more aspects of the invention.

FIG. 3 is a flow diagram depicting an exemplary embodiment of a method 300 for packet scheduling in accordance with one or more aspects of the invention. The method 300 is performed by the scheduling processor 106 to distribute packets from the traffic flows for the mobile stations 104. The method begins at step 302, where a CQF value for each of the mobile stations is determined. A CQF value for each of the mobile stations 104 is determined by the scheduling processor 106 using the method 200 described above. At step 304, packets are distributed to the mobile stations 104 in accordance with a QoS scheduling algorithm using the CQF values as parametric input. Exemplary QoS scheduling algorithms are described below. At step 306, a determination is made whether new data transmission rates have been determined. If so, the method 300 returns to step 302 and repeats for the next measurement period. Otherwise, step 306 is repeated.

Figure 4:
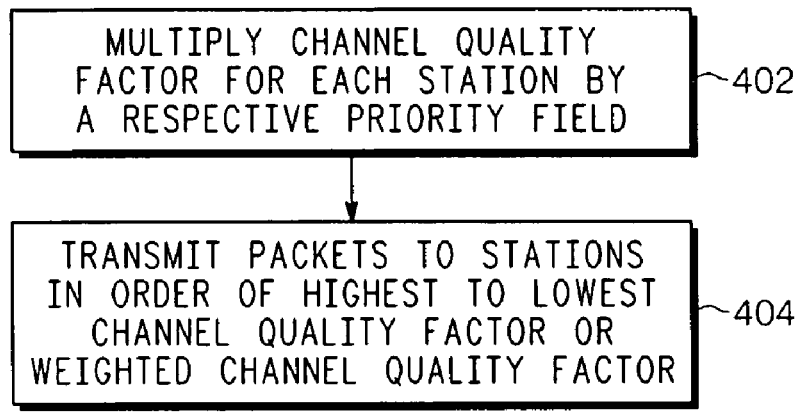
FIG. 4 is a flow diagram depicting an exemplary embodiment of a method for QoS scheduling in accordance with one or more aspects of the invention.

FIG. 4 is a flow diagram depicting an exemplary embodiment of a method 400 for QoS scheduling in accordance with one or more aspects of the invention. The method 400 may be performed at step 304 of the method 300 described above. The method 400 begins at step 401. At an optional step 402, the value of the CQF for each of the mobile stations 104 is weighted using a priority field. For example, the traffic flows for each of the mobile stations 104 may include internet protocol (IP) packets. The IP packets may include a well-known type-of-service (ToS) field, as specified in request for comments (RFC) 1349. The CQF value for a given mobile station may be multiplied with a precedence value in the ToS fields of IP packets in that mobile station's traffic flow. Those skilled in the art will appreciate that the CQF values may be weighted using other types of priority fields or values associated with the traffic flows.

At step 404, packets in the traffic flows are transmitted in order of highest CQF value to lowest CQF value. If the CQF values are weighted at step 402, then the weighted CQF values are used instead of the actual CQF values. A higher CQF value or weighted CQF value indicates a higher priority traffic flow, whereas a lower CQF value or weighted CQF value indicates a lower priority traffic flow. Packets are distributed from the higher priority traffic flows before the lower priority traffic flows.

Figure 5:
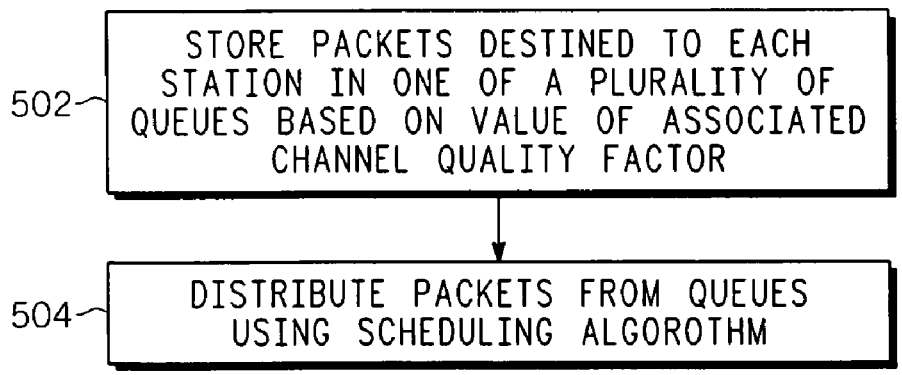
FIG. 5 is a flow diagram depicting another exemplary embodiment of a method for QoS scheduling in accordance with one or more aspects of the invention.

FIG. 5 is a flow diagram depicting another exemplary embodiment of a method 500 for QoS scheduling in accordance with one or more aspects of the invention. The method 500 may be performed at step 304 of the method 300 described above. The method 500 begins at step 502, where the packets destined to each of the mobile stations 104 are stored in one of a plurality of queues based on the value of the associated channel quality factor. For example, packets going to mobile stations with a CQF between 0 and 0.5 are stored in one queue (Queue D), packets destined to mobile stations with a CQF between 0.5 and 1 are placed in another queue (Queue C), packets destined to mobile stations with a CQF between 1 and 1.5 are stored in another queue (Queue B), and packets destined to mobile stations with a CQF between 1.5 and 2 are stored in another queue (Queue A). Packets in Queue A have a higher priority than packets in Queue D. At step 504, the packets in the queues are distributed to the mobile stations 104 using a scheduling algorithm. Any of several scheduling algorithms known in the art may be used, such as the strict priority algorithm, the fair weighted queuing algorithm, and the like.

Figure 6:
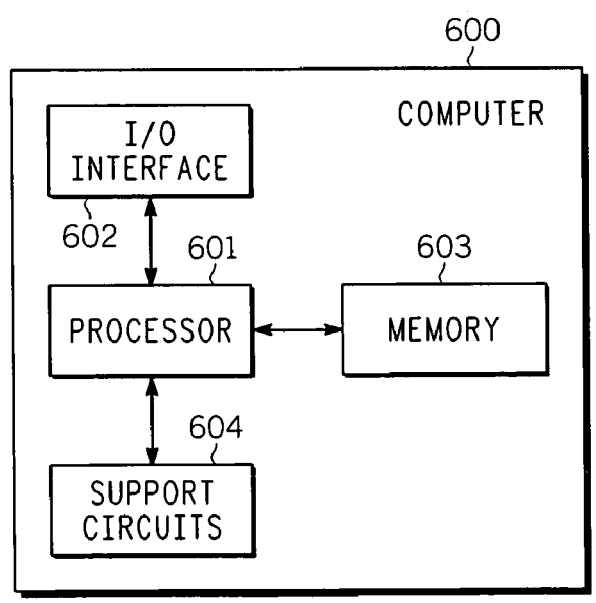
FIG. 6 is a block diagram depicting an exemplary embodiment of a computer suitable for implementing the processes and methods described herein.

FIG. 6 is a block diagram depicting an exemplary embodiment of a computer 600 suitable for implementing the processes and methods described herein. The computer 600 may be used to implement the scheduling processor 106 of the base station 102. The computer 600 includes a processor 601, a memory 603, various support circuits 604, and an I/O interface 602. The processor 601 may be any type of microprocessor known in the art. The support circuits 604 for the processor 601 include conventional cache, power supplies, clock circuits, data registers, I/O interfaces, and the like. The I/O interface 602 may be directly coupled to the memory 603 or coupled through the processor 601. The I/O interface 602 may be configured for communication with circuits of the base station 102 to receive data transmission rates and to provide instructions for distributing data to the mobile stations 104.

The memory 603 may store all or portions of one or more programs and/or data to implement the processes and methods described herein. The memory 603 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

One or more aspects of the invention may be implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD).

While the foregoing is directed to illustrative embodiments of the present invention, other and further embodiments of the invention may be devised without departing from the basic scope thereof, and the scope thereof is determined by the claims that follow.

What is claimed is:

1. In a communication system having a base station in wireless communication with a plurality of mobile stations, a method, comprising:

measuring first values for a data transmission rate for each of the plurality of mobile stations over time, wherein the first values comprise a current value and one or more past values of the data transmission rate for each of the plurality of mobile stations;

computing second values for a function of the data transmission rate for each of the mobile stations, wherein the second values include a current value of the function and at least one past value of the function that are determined, respectively, from the function evaluated at any current time and at least one previous time, and wherein the function at a given time depends upon at least one of the first values for the mobile station, and one or more defined constants;

computing, for each of the plurality of mobile stations, a rate of change of the function using the second values associated therewith;

computing, for each of the plurality of mobile stations, a stability of the function using the second values associated therewith and a maximum value of the second values;

determining, for each of the plurality of mobile stations, a channel quality factor using the current value of the function, the rate of change of the function, and the stability of the function associated therewith; and at least one of scheduling opportunities for the plurality of mobile stations to transmit traffic to the base station using a quality of service (QoS) scheduling algorithm having the channel quality factor for each of the mobile stations as parametric input; and scheduling opportunities for exchange of traffic between the base station and the plurality of mobile stations using a quality of service (QoS) scheduling algorithm having the channel quality factor for each of the mobile stations as parametric input.

2. The method of claim 1, further comprising:

scheduling traffic flows for the plurality of mobile stations using a quality of service (QoS) scheduling algorithm having the channel quality factor for each of the mobile stations as parametric input.

3. The method of claim 2, wherein the step of scheduling comprises:

sending packets to the mobile stations in order of the mobile station having a highest channel quality factor to the mobile station having the lowest channel quality factor.

4. The method of claim 2, wherein the step of scheduling comprises:

storing each of a plurality of packets in one of a plurality of queues based on the channel quality factor of a destination mobile station; and distributing the plurality of packets from the plurality of queues in accordance with a scheduling algorithm.

5. The method of claim 1, wherein the step of computing the rate of change of the function comprises, for each of the mobile stations:

determining a plurality of differences between successive pairs of the second values; and summing and normalizing the plurality of differences to produce a slope factor.

6. The method of claim 5, wherein the step of computing the stability of the function comprises, for each of the mobile stations:

determining a plurality of differences between successive pairs of the second values; and computing a weighted sum of the plurality of differences to produce a stability factor.

7. The method of claim 1, wherein the step of computing the second values comprises:

normalizing the first values for each of the plurality of mobile stations.

8. The method of claim 1, wherein the function of the data transmission rate is indicative of a relative change among the first values of the data transmission rate with respect to a maximum value of the data transmission rate.

9. An apparatus, comprising:

a rate measurement module which measures first values for a data transmission rate for each of a plurality of mobile stations, wherein the first values comprise a current value and one or more past values of the data transmission rate for each of the plurality of mobile stations; and a scheduler configured to:

compute second values for a function of the data transmission rate for each of the mobile stations, wherein the second values include a current value of the function and at least one past value of the function that are determined, respectively, from the function evaluated at a current and at least one previous time, and wherein the function at any given time depends upon at least one of the first values for the mobile station, and one or more defined constants;

compute, for each of the plurality of mobile stations, a rate of change of the function using the second values associated therewith;

compute, for each of the plurality of mobile stations, a stability of the function using the second values associated therewith and a maximum value of the second values;

determine, for each of the plurality of mobile stations, a channel quality factor using the current value of the function, the rate of change of the function, and the stability of the function associated therewith; and at least one of scheduling opportunities for the plurality of mobile stations to transmit traffic to the base station using a quality of service (QoS) scheduling algorithm having the channel quality factor for each of the mobile stations as parametric input; and scheduling opportunities for exchange of traffic between the base station and the plurality of mobile stations using a quality of service (QoS) scheduling algorithm having the channel quality factor for each of the mobile stations as parametric input.

10. The apparatus of claim 9, wherein the scheduler is further configured to:

schedule traffic flows for the plurality of mobile stations using a quality of service (QoS) scheduling algorithm having the channel quality factor for each of the mobile stations as parametric input.

11. The apparatus of claim 10, wherein the scheduler is further configured to:

schedule packets for transmission to the mobile stations in order of the mobile station having a highest channel quality factor to the mobile station having the lowest channel quality factor.

12. The apparatus of claim 11, wherein the scheduler is further configured to:

store each of a plurality of packets in one of a plurality of queues based on the channel quality factor of a destination mobile station; and schedule the plurality of packets for distribution from the plurality of queues in accordance with a scheduling algorithm.

13. The apparatus of claim 9, wherein the scheduler is configured to compute the rate of change of the function, for each of the mobile stations, by:

determining a plurality of differences between successive pairs of the second values; and summing and normalizing the plurality of differences to produce a slope factor.

14. The apparatus of claim 13, wherein the scheduler is configured to compute the stability of the function, for each of the mobile stations, by:

determining a plurality of differences between successive pairs of the second values; and computing a weighted sum of the plurality of differences to produce a stability factor.

15. The apparatus of claim 9, wherein the scheduler is configured to compute the second values by normalizing the first values for each of the plurality of mobile stations.

16. The apparatus of claim 9, wherein the function of the data transmission rate is indicative of a relative change among the first values of the data transmission rate with respect to a maximum value of the data transmission rate.

17. A tangible computer readable non-transitory medium having stored thereon instructions that, when executed by a processor, cause the processor to perform a method, comprising:

measuring first values for a data transmission rate for each of a plurality of mobile stations over time, wherein the first values comprise a current value and one or more past values of the data transmission rate for each of the plurality of mobile stations;

computing second values for a function of the data transmission rate for each of the mobile stations, wherein the second values include a current value of the function and at least one past value of the function that are determined, respectively, from the function evaluated at a current time and at least one previous time, and wherein the function at any given time depends upon at least one of the first values for the mobile station, and one or more defined constants;

computing, for each of the plurality of mobile stations, a rate of change of the function using the second values associated therewith;

computing, for each of the plurality of mobile stations, a stability of the function using the second values associated therewith and a maximum value of the second values;

determining, for each of the plurality of mobile stations, a channel quality factor using the current value of the function, the rate of change of the function, and the stability of the function associated therewith; and further comprising at least one of:

scheduling opportunities for the plurality of mobile stations to transmit traffic to the base station using a quality of service (QoS) scheduling algorithm having the channel quality factor for each of the mobile stations as parametric input; and scheduling opportunities for exchange of traffic between the base station and the plurality of mobile stations using a quality of service (QoS) scheduling algorithm having the channel quality factor for each of the mobile stations as parametric input.

18. The tangible computer readable medium of claim 17, further comprising:

scheduling traffic flows for the plurality of mobile stations using a quality of service (QoS) scheduling algorithm having the channel quality factor for each of the mobile stations as parametric input.

19. The tangible computer readable medium of claim 17, wherein the step of computing the rate of change of the function comprises, for each of the mobile stations:

determining a plurality of differences between successive pairs of the second values; and summing and normalizing the plurality of differences to produce a slope factor.

20. The tangible computer readable medium of claim 19, wherein the step of computing the stability of the function comprises, for each of the mobile stations:

determining a plurality of differences between successive pairs of the second values; and computing a weighted sum of the plurality of differences to produce a stability factor.

21. The tangible computer readable medium of claim 17, wherein the step of computing the second values comprises:

normalizing the first values for each of the plurality of mobile stations.

22. The tangible computer readable medium of claim 17, wherein the function of the data transmission rate is indicative of a relative change among the first values of the data transmission rate with respect to a maximum value of the data transmission rate.

\* \* \* \* \*